United States Patent [19]
Eckberg et al.

[11] Patent Number: 5,227,410
[45] Date of Patent: Jul. 13, 1993

[54] UV-CURABLE EPOXYSILICONE-POLYETHER BLOCK COPOLYMERS

[75] Inventors: Richard P. Eckberg, Saratoga Springs; Robert F. Agars; Brian D. Shepherd, both of Clifton Park, all of N.Y.

[73] Assignee: General Electric Company, Waterford, N.Y.

[21] Appl. No.: 802,679

[22] Filed: Dec. 5, 1991

[51] Int. Cl.$^5$ .................. C08G 65/32; C08G 77/12; C08L 71/02; C08F 283/00
[52] U.S. Cl. .................. 522/75; 522/170; 522/172; 525/403; 525/409; 525/479; 528/15; 528/21; 528/25; 528/27; 528/31; 428/413; 428/447
[58] Field of Search .............. 528/27, 31, 25, 21, 528/15; 525/403, 409, 479; 522/170, 172, 75; 428/413, 447

[56] References Cited

U.S. PATENT DOCUMENTS

| | | | |
|---|---|---|---|
| 3,629,310 | 12/1971 | Bailey et al. | 525/403 |
| 4,184,004 | 1/1980 | Pines et al. | 428/413 |
| 4,279,717 | 7/1981 | Eckberg et al. | 204/159 |
| 4,302,571 | 11/1981 | Arai et al. | 525/409 |
| 4,323,488 | 4/1982 | Takago et al. | 528/31 |
| 4,347,346 | 8/1982 | Eckberg et al. | 528/31 |
| 4,421,904 | 12/1983 | Eckberg et al. | 528/27 |
| 4,547,431 | 10/1985 | Eckberg | 428/413 |
| 4,576,999 | 3/1986 | Eckberg | 525/426 |
| 4,666,745 | 5/1987 | Huhn et al. | 528/27 |
| 4,758,646 | 7/1988 | Raleigh et al. | 528/15 |
| 4,859,529 | 8/1989 | Raleigh et al. | 428/290 |
| 4,882,201 | 11/1989 | Crivello et al. | 427/54 |
| 4,956,206 | 9/1990 | Kaiya | 427/387 |
| 4,977,198 | 12/1990 | Eckberg | 522/25 |
| 4,990,546 | 2/1991 | Eckberg | 522/170 |
| 4,998,504 | 1/1991 | Zotto et al. | 424/65 |

FOREIGN PATENT DOCUMENTS 2-129219 5/1990 Japan.

Primary Examiner—Marion E. McCamish
Assistant Examiner—Susan Berman

[57] ABSTRACT

The invention relates to silicone-polyether linear block copolymers of the formula

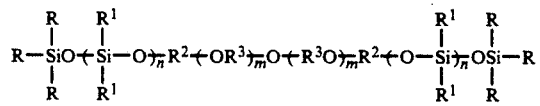

wherein,
R is hydrogen or a $C_{(1-8)}$ alkyl, alkoxyl or haloalkyl radical or a monovalent epoxy-functional organic radical;
$R^1$ is hydrogen or a $C_{(1-8)}$ alkyl or alkoxyl radical, or a monovalent epoxy-functional organic radical;
provided that at least two R or $R^1$ groups are either hydrogen or monovalent epoxy-functional organic radicals;
$R^2$ is a divalent alkylene radical;
$R^3$ is a $C_{(2-6)}$ alkyl or alkoxyl radical;
n is a positive integer of about 4 to about 400;
m is a whole number of from 0 to about 50; and, each of R, $R^1$, $R^2$ and $R^3$ may be unsubstituted or substituted. The invention also relates to UV-curable compositions comprising the above-described compound, with or without a UV-detectable dye marker, and a process for making such a compound.

14 Claims, No Drawings

UV-CURABLE EPOXYSILICONE-POLYETHER BLOCK COPOLYMERS

BACKGROUND OF THE INVENTION

The present invention relates to flexible, UV curable, epoxysilicone-polyether coatings which are obtained by the incorporation of polyether block segments into linear SiH-containing silicone backbones, which may be followed by conversion of the SiH-containing silicone-polyethers into their epoxy-containing linear block copolymer derivatives. The invention also relates to flexible, UV-curable epoxysilicone-polyether coating as described above and further incorporating one or more fluorescent dye markers. The product of the present invention is useful for a wide range of coating applications including release coatings, optical fiber buffer coatings, conformal coatings and electronic encapsulation, and when produced with UV-detectable dye marker, the product of the invention is particularly useful for ascertaining the integrity of very thin coatings The invention further relates to a process for producing the above-mentioned epoxy-containing silicone-polyether linear block copolymers.

Epoxysilicone polymers have been widely used in the release coating and pressure-sensitive adhesive (PSA) industries. For example, see generally the chapter entitled "Silicones" by B. Hardman and A. Torkelson in the *Encyclopedia of Polymer Science and Engineering*, 2nd edit., Vol. 15, pp. 204–308, 1989, John Wiley & Sons, Inc., New York. Epoxysilicone polymers are conveniently manufactured through the hydrosilation reaction between an SiH-containing silicone monomer or polymer and olefin epoxides. The general hydrosilation reaction between a silicone and olefin can be expressed for monofunctional silane derivatives as

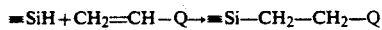

and for di-functional siloxane derivatives as

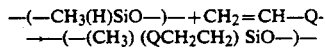

where in both cases Q is an organic radical. The hydrosilation reaction is particularly useful for the addition of functional radicals onto silanes and silicones. For example, reaction of a hydrogensiloxane with an epoxy-containing olefin yields an epoxy-functional siloxane.

Epoxysiloxanes generated through, for example, the hydrosilation reaction can be cured either thermally or, in the presence of the appropriate catalysts and possibly accelerators, by irradiation. Generally, UV-induced, cationic catalysis is preferred in the cure reaction of epoxysilicones due to the relatively low cost of this process, relatively high cure rates achieved, the low temperature which can be employed, thereby preventing damage to temperature-sensitive materials being coated, and the low risk of potential hazards to both industrial users and the environment. Upon exposure to UV radiation, cationic type photo-initiators generate a strong Brönsted acid, which effects the opening of the oxirane ring in the epoxide radical of an epoxysilicone polymer, and the subsequent etherification through which cross-linking of the resin is achieved.

The curing of epoxysilicone polymers is well documented in the patent literature. For example, U.S. Pat. No. 4,576,999, issued to Eckberg, discloses epoxy and/or acrylic functional polysiloxanes as UV-curable abhesive release coatings. The catalyst may be a photo-initiating onium salt and/or a free radical photo-initiating catalyst U.S. Pat. Nos. 4,279,717 and 4,421,904, both issued to Eckberg, et al., disclose epoxy functional diorganosiloxane fluids combined with iodonium salts to form UV-curable abhesive release compositions. U.S. Pat. No. 4,547,431 discloses epoxy functional diorganosiloxane combined with onium salt catalyst and polyfunctional epoxy monomers to also form an abhesive release coating. All patents and publications mentioned herein are incorporated by such reference.

As described in U.S. Pat. No. 4,576,999, the preferred UV photo-initiators for the curing of epoxysilicones are the "onium" salts, of the general formulas

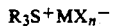

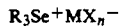

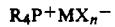

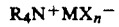

where different radicals represented by R can be the same or different organic radicals from 1 to about 30 carbon atoms, including aromatic carbocyclic radicals from 6 to 20 carbon atoms which can be substituted with from 1 to 4 monovalent radicals selected from $C_{(1-8)}$alkoxyl, $C_{(1-8)}$alkyl, nitro, chloro, bromo, cyano, carboxy, mercapto, etc., and also including aromatic heterocyclic radicals including, for example, pyridyl, thiopheny, pyranyl, and others; and $MX_n^-$ is a non-basic, non-nucleophilic anion, such as $BF_4^-$, $PF_6^-$, $AsF_6^-$, $SbF_6^-$, $HSO_4^-$, $ClO_4^-$, and others as known in the art. The photo-initiators may be mono- or multi-substituted mono, bis or tris aryl salts. In the above and subsequent definitions, the prefix "hetero" is meant to include linear or cyclic organic radicals having incorporated therein at least one non-carbon and non-hydrogen atom, and is not meant to be limited to the specific examples contained herein. According to U.S. Pat. No. 4,977,198, the onium salts are well known, particularly for use in catalyzing cure of epoxy functional materials.

As disclosed in U.S. Pat. No. 4,882,201, the radiation-initiated cure of epoxysilicones coated on a substrate can be achieved with UV lamps such as: mercury arc lamps (high, medium and low pressure), Xenon arc lamps, high intensity halogentungsten arc lamps, microwave driven arc lamps and lasers. Additionally, ionizing radiation using, for example, $^{60}Co$ is also useful as a radiation source. In this latter instance, the ionizing radiation serves both to initiate cure and at the same time sterilize an epoxysilicone coating.

Certain polyether-silicone copolymers are known. For example, U.S. Pat. No. 4,988,504 discloses polysiloxane polymers bearing pendant polyether radicals for use in stabilizing silicone emulsions. Similarly, Japanese Published Patent Application 02-129219 discloses use of epoxysilicones bearing radially pendant polyethers, described as having good compatibility with onium salt photo-initiators, for use as coatings which can be printed on. U.S. Pat. Nos. 4,758,646 and 4,859,529 disclose bis(alkoxysilyl)polyethers for use as a fabric sizing agent, and U.S. Pat. No 4,184,004 describes organosilicone terpolymers bearing radially pendant polyethers as a fabric softening agent. In each of the above-mentioned patents, the polymer may be described as a "block" copolymer with respect to the silicone monomeric units. For example, compounds of the formula

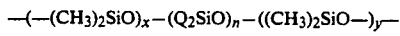

wherein n, x and y are greater than 1 and the substituent Q (for example, a polyether) is in a radially pendent block, as opposed to randomly distributed, with respect to the $(CH_3)_2SiO$ backbone. This molecular organization should be contrasted with that of a "linear block copolymer" of the general formula

wherein n, x and y are greater than 1 and the substituent Q again perhaps a polyether monomeric unit, is incorporated directly into a linear siloxane backbone.

Dye sensitizers are also known as, for example, disclosed in the aforementioned U.S. Pat. No. 4,977,198. Dye sensitizers are cure accelerators which serve to increase the effectiveness of the photocatalyst by generally absorbing light that is of a wavelength outside the useful range of that of the photo-initiator and transferring the absorbed energy to the photo-initiator. Thus, the dye sensitizer results in better utilization of the energy available from a light source, with the result that this source need not be specifically tuned to match the main absorption wavelength of the photo-initiator. Dyes which are useful with the above-described onium salts are cationic dyes, such as shown in Vol. 20, pages 194–197 of the Kirk-Othmer Encyclopedia, 2nd Edition, 1965, John Wiley & Sons, New York. Some of the cationic dyes which can be used as sensitizers include, for example, Acridine Orange; C. I. 46005;
Acridine Yellow; C.I. 46035;
Phosphine R; C.I. 46045;
Benzoflavin; C.I. 46065; and,
Setoflavin; C.I. 49005.

In addition, some basic dyes can also be used as sensitizers. Some of these basic dues are shown in Vol. 7, p.532–4 of Kirk-Othmer Encyclopedia, as cited above, and include:

Hematoporphyrin;
4,4'-bisdimethylaminobenzophenone; and,
4,4'-bisdiethylaminobenzophenone.

Also suitable are xanthones, such as thioxanthone, 2-isopropyl xanthone, and aminoxanthene. Specific instances where dye sensitizers are employed are detailed, for example, in U.S. Pat. No. 4,026,705.

A major drawback to the use of the "onium" salt catalysts in the polymerization of epoxysilicones lies in the highly polar nature of these salts. As the commonly used silicones are based on non-polar polydimethylsiloxane polymers, the polar "onium" catalysts are not sufficiently miscible with the resin to affect as fast a cure rate as would generally be desirable nor are suspensions of the insoluble catalysts stable. The need therefore exists to devise novel materials and processes in which the miscibility of the photo-initiators and siloxanes are much improved.

Two general approaches have been taken to increase the miscibility of an onium photo-initiators and an epoxysilicone resin. The first approach has been to increase the hydrophobicity of the catalyst through use of onium salts containing non-polar, organic radicals. This approach led to investigations of potential onium salts, particularly long-chain alkyl-substituted bisaryliodonium salts, which are less polar in nature than their sulfonium counterparts. As disclosed in U.S. Pat. No. 4,882,201, particularly useful catalysts of this type are the linear or branched, $C_8$ or greater alkoxy, mono- or disubstituted, bisaryliodonium salts. As further disclosed in U.S. Pat. No. 4,882,201, the long-chain, alkoxy-substituted aryliodonium salts also possess the useful property of being much less toxic than the non-substituted onium salt photo-initiators.

The second approach to alleviating the aforementioned miscibility problem between the photo-initiator and a silicone has been to incorporate silphenylene blocks into a siloxane backbone, for example as disclosed in U.S. Pat. No. 4,990,546. This approach, when coupled with the use of the above-described substituted onium salts, proved useful in increasing photo-initiated cure. However, the incorporation of silphenylene blocks into a silicone resin is not commercially viable, since the disilyl-functional benzenes needed to produce the silphenylene-containing polymers are not available in commercial quantities.

In a more indirect effort to overcome the relatively slow cure rates due to the above-mentioned miscibility problem, an epoxysilicone resin is "pre-crosslinked" as disclosed, for example, in U.S. Pat. No 4,987,158. While such "pre-crosslinked" epoxysilicone networks, formed from vinyl tetramer and SiH-containing linear silicones partially overcome some of the slow cure associated with long chain epoxysilicone coatings, these partially-cured resins still do not possess a solubility with iodonium catalysts that is sufficiently high to be commercially useful as UV-curable materials in most applications.

Another problem typically encountered in the silicone coating industry, is that of the difficulty in assessing the sufficiency of very thin silicone coatings, particularly when these coatings are applied to shiny or glossy types of film liner. For example, in the release coating and electronics industry, if the coating on a substrate contains gaps wherein no silicone is present, there results a poor product performance and the subsequent economic waste associated therewith. It would be advantageous therefore to provide a system whereby the integrity of a silicone release coating could be easily and economically evaluated. In particular, it would be desirable to incorporate a colorless marker into a silicone resin, as this would still allow visually clear coatings to be produced UV-detectable dye markers would be particularly preferable for such use. However, possibly in part due to the above-mentioned miscibility problems encountered with the use of non-polar silicone resins, such a system has heretofore not been available.

Due to the above-mentioned considerations, it has therefore been desirable to search for novel ways in which to increase the miscibility of polar compounds, particularly photo-initiator salts, in epoxysilicone resins such that high and efficient cure rates can be economically achieved. In addition it would also be advantageous to, at the same time, provide for epoxysilicones that are more flexible and elastomeric than traditionally available, and thus have a greater number of potential uses than current resins. Finally, it would be particularly advantageous to, at still the same time, provide a system whereby the integrity of application of a silicone coating, particularly thin clear coatings, on glossy or shiny substrates can be easily monitored.

One aim of the present invention is to alleviate the miscibility problems of onium salt catalysts with silicone resins, and thereby improve the cure characteristics of these resins. A second aim of the invention is to prepare more highly flexible and elastomeric silicone resins, also with faster cure rates than previously possible. Yet another aspect of the present invention is to devise a system for easily and accurately monitoring the integrity of a coating of these resins onto a substrate. A further aim of the present invention is to provide a process for preparing a resin with the above-mentioned characteristics.

SUMMARY OF THE INVENTION

The invention provides for resins composed of silicone-polyether block copolymers of the formula

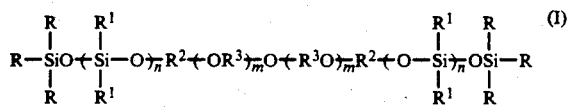

wherein,

R is hydrogen or a $C_{(1-8)}$ alkyl, alkoxyl, or haloalkyl radical, preferably trifluoropropyl, or a monovalent epoxy-functional radical of from about 2 to about 20 carbons;

$R^1$ is hydrogen or a $C_{(1-8)}$ alkyl or alkoxyl radical, preferably a methyl radical, or a monovalent epoxy-functional organic radical of from about 2 to about 20 carbons;

provided that at least two R or $R^1$ groups are either hydrogens or epoxy-functional organic radicals;

$R^2$ is a $C_{(1-6)}$ divalent alkylene radical, preferably ethylene;

$R^3$ is a $C_{(2-6)}$ alkyl or alkoxyl radical, preferably an ethyl or propyl radical;

n is a positive integer of about 4 to about 400; and, m is a whole number from 0 to about 50.

Any or all of R, $R^1$, $R^2$, or $R^3$ groups may be either linear or branched, and may be unsubstituted or substituted with functional groups such as halogen, hydroxy, cyano, amino, thio, mercapto, and the like. Additionally, each of the individual R, $R^1$, $R^2$, or $R^3$, groups may be the same or different.

The silicone polyether copolymer of the present invention is much more miscible with polar molecules, particularly iodonium salt photo-initiators and UV-detectable dyes, than non-polyether containing silicone resins. The invention also provides for an epoxysilicone-polyether copolymer resin incorporating a UV-detectable organic dye, through which the pattern and efficiency of coating of the resin onto a substrate is easily and accurately monitored. The invention further provides for a process of preparing and curing such silicone-polyether block copolymers.

DETAILED DESCRIPTION OF THE INVENTION

In order to prepare epoxysilicone resins in which onium salt photo-initiators are miscible, it would be desirable to provide a resin that is compatible with the polar characteristic of onium salts. In the process and product of the present invention, an epoxysilicone resin is made more polar by the inclusion of linear blocks comprising a polyether into a siloxane backbone to generate a linear epoxysilicone-polyether block copolymer, compound (I), of the average formula

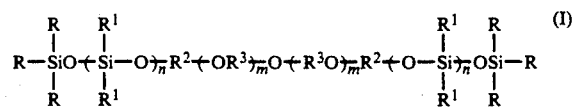

wherein,

R is hydrogen or a $C_{(1-8)}$ alkyl, alkoxyl, or haloalkyl radical, preferably trifluoropropyl, or a monovalent epoxy-function radical of from about 2 to about 20 carbons;

$R^1$ is hydrogen or a $C_{(1-8)}$ alkyl or alkoxyl radical, preferably a methyl radical, or a monovalent epoxy-functional radical of from about 2 to about 20 carbons;

provided that at least two R or $R^1$ groups are either hydrogens or monovalent epoxy-functional organic radicals;

$R^2$ is a $C_{(1-6)}$ divalent alkylene radical, preferably ethylene;

$R^3$ is a $C_{(2-6)}$ alkyl or alkoxyl radical, preferably an ethyl or propyl radical;

n is a positive integer of about 4 to about 400 and, m is a whole number of 0 to about 50.

Any or all of R, $R^1$, $R^2$, or $R^3$ groups may be either linear or branched, and may be unsubstituted or substituted with functional groups such as halogen, hydroxy, cyano, amino, thio, mercapto, and the like. Additionally, each of the individual R, $R^1$, $R^2$, or $R^3$, groups may be the same or different The formula of compound (I) is a number average formula, and the invention also incorporates linear silicone-polyether block copolymers in which compounds based on the formula of compound I are linked either in end-to-end or branched form, or both, to form longer copolymers that have a formula which is a multiple of that of compound (I).

In general, the polyether block of compound I is derived from a diallyl derivative of a glycol, having the formula

$$CH_2=CHCH_2O(R^3O)_mCH_2CH=CH_2 \quad (II)$$

wherein $R^3$ and m are defined as for compound (I), and each $R^3$ radical may be the same or may be different. Preferably, the $R^3$ groups in compound (II) are either ethyl or propyl radicals, and most preferably the polyether block is a diallyl derivative of tetraethylene glycol (TEGDAE) of the formula

$$CH_2=CHCH_2O(CH_2CH_2O)_4CH_2CH=CH_2 \quad (III)$$

The incorporation of a polyether block into a polyorganosiloxane to produce the epoxysilicone-polyether linear block copolymers of the present invention is achieved through a two-step hydrosilation process. As discussed below, these reactions may be catalyzed either by conventional platinum catalysts as described in U.S. Pat. Nos. 3,220,927, 3,419,593 or 3,775,452, or by rhodium catalysts as described in U.S. Pat. No. 3,928,629. The first hydrosilation reaction is that between a molar excess of an SiH-containing linear silicone with a diallyl ether derivative of a glycol described above. The molar excess described is meant to mean a molar excess of reactive H in the silicone with respect to the number of double bonds in the diallyl ether. In such a case, after the first hydrosilation reaction there still exists unreacted SiH groups. In a preferred embodiment of the present process, at least 20% of the SiH initially present is unreacted after the first hydrosilation reaction, while in the most preferred process at least 40% of reactive SiH remains. The product of the first hydrosilation reaction generally has the formula of Compound (I), with the stipulation that a least two R or $R^1$ groups are hydrogen.

In the product and process of the invention, the SiH-containing linear silicone is preferably an SiH-stopped polydimethylsiloxane due to commercial availability. However, as other substituted organosiloxanes become commercially available in sufficient quantity, use of these materials would also be preferred in practicing the present invention, provided that these materials do not substantially alter the properties of the product of the invention described herein.

The second step of the process of the invention is the reaction between the SiH-containing polysiloxane-polyether copolymer and an olefin epoxide, to generate an epoxysilicone-polyether linear block copolymer of the formula of Compound (I), with the stipulation that at least two R or $R^1$ groups are monovalent epoxy-functional organic radicals of from about 2 to about 20 carbons. Examples of suitable olefin epoxy compounds for use in the second hydrosilation reaction step in the process of the present invention include limoneneoxide, 4-vinylcyclohexeneoxide (VCHO), allylglycidylether, glycidylacrylate, 1-methyl-4-isopropenyl cyclohexeneoxide, 7-epoxy-1-octene, 2,6-dimethyl-2,3-epoxy-7-octene, vinylnorbornenemonoxide, dicyclopentadienemonoxide, and the like. Preferably the unsaturation in the olefin epoxides is terminally located on an alkyl chain, as such bonds have been found to be more reactive in the hydrosilation reaction. Most preferably, 4-vinylcyclohexene oxide is used as the olefin epoxide in the practice of the process of the invention. By "linear block copolymer" it is meant that the polyether blocks are incorporated into, and flanked by, an organosiloxane polymer chain in an end-to-end fashion, as opposed to an incorporation of a polyether block in a radially pendant fashion.

The hydrosilation catalyst used in the process of the present invention may be a either a platinum or rhodium metal ion complex. Rhodium compounds are more selective for the hydrosilation reaction than are platinum compounds, the latter of which has been found to also catalyze undesirable side reactions. In the process of the present invention, the amount of catalyst employed is not critical, so long as proper polymerization is affected. However, as with any catalyst, it is preferred to use the smallest amount that is effective. For platinum catalysts, ordinarily 5 parts platinum metal per 1 million parts of siloxane will be effective to promote the hydrosilation reaction. Examples are those described in U.S. Pat. Nos. 3,220,972; 3,419,593; 3,814,730; 3,775,452; and, 3,715,334. Particularly useful are those catalysts derived from chloroplatinic acid which has been treated with tetramethyldivinylsiloxane, as described in U.S. Pat. No. 3,814,730. Rhodium catalysts are used at a concentration of from about 0.1 to about 50 parts as rhodium metal per million parts of the curable resin. Preferably, such a catalyst is employed at from between about 1 to about 20 parts as rhodium metal per million parts of the curable resin. Most preferably, the rhodium catalyst is used at from about 2 to about 5 parts as rhodium metal as compared to 1 million parts of the curable resin. The most preferred rhodium catalysts are tris(di-n-butylsulfide) rhodium trichloride and tris(triphenylphosphine) rhodium monochloride, the latter commonly known as Wilkinson's catalyst. The catalysts of the present invention may suitably be in the form of an ethanolic solution.

Tertiary amines may be used to "pre-stabilize" an epoxysilicone mixture provided that certain rhodium catalysts are used in the reaction. Such tertiary amines have been found to protect against acid-catalyzed cross-linking of epoxy bearing compounds, including the product of the invention, and thereby protect against premature gelling of epoxy-functionalized polymers. The premature gelling may occur at any time epoxy-functional groups are sufficiently heated as, for example, during the process step of stripping light ends and solvent to prepare the product of the invention as described below. Tertiary amines which are suitable for use in practicing the present invention include trialkylamines, triarylamines, and mixed tertiary amines containing both alkyl and aryl substituents, such as diethylphenylamine, diphenylethylamine, etc. A preferred tertiary amine for this use in the product and process of the present invention is methyldicocoamine, $CH_3(C_{18}H_{37})_2N$.

In the process of the present invention, the tertiary amine stabilizer is employed at a concentration effective to prevent the premature reaction of epoxy-functional polymers and yet still allow efficient polymerization. Generally, these compounds are satisfactorily used in the process of the invention at a concentration of between about 10 ppm and 1000 ppm, by weight, as compared to the weight of the curable resin. Preferably the tertiary amine stabilizers are employed from between about 20 ppm and 500 ppm by weight, and most preferably from about 50 ppm to about 200 ppm by weight, each as compared to the weight of the curable resin.

The onium salt photocatalyst used to affect cure in the process of the present invention may be any of those previously described in the literature. Preferred in the process of the present invention is the use of bisaryliodonium salt catalysts, particularly bis(dodecylphenyl) iodonium hexafluoroantimonate, bis(dodecylphenyl) iodonium hexafluoroarsenate and (4-octyloxyphenyl)(phenyl) iodinium hexafluoroantimonate, with the antimonate salts most preferred in practicing the invention.

In the product and process of the present invention, pre-crosslinked epoxysilicones may be used to decrease the cure time and energy required by the photo-initiated cure reaction. Such epoxysilicones can be prepared whereby the first hydrosilation step described above is replaced by the hydrosilation reaction between a mixture of diallylated polyethers and vinyl-stopped silicones, and SiH-containing siloxanes. This "pre-crosslink" reaction is then followed by a second hydrosilation addition of an epoxy-functional olefin such as described above. Pre-crosslinking of the silicone fluid means that there has been partial cross-linking or cure of the composition and offers the advantages to the present invention of enabling swift UV-initiated cure with little expense for energy and elimination of the need for solvent In the process of the present invention, the ratio of vinyl-stopped and diallylated polyether to reactive SiH-containing silicones may be varied greatly so long as the total molar equivalent of reactive double bonds in the mixture is less that the molar equivalent of reactive SiH groups. It is preferred, however, that after the pre-crosslinking reaction there is greater than 20% of the reactive SiH initially present still remaining. It is most preferred that greater than 40% of the initial SiH groups are present after completion of the pre-crosslink reaction.

The onium salt-compatible epoxysilicone-polyether linear block copolymers of the present invention are conveniently blended into curable compositions by simply mixing with the onium salt photocatalyst and other ingredients as the skill in the art dictates. Of the onium photocatalysts there is generally required from about 0.1% to about 15% by weight as compared to the weight of the curable composition. Of the dye sensitizers there may be employed any effective amount but generally from about 0.02% to about 5% by weight based on the weight of the total curable composition. The SiH-stopped siloxane is generally employed at from about 20 to about 95 parts by weight as compared to the total weight of the curable resin, and the diallyl derivative of a glycol is generally employed at a concentration from about 5 to about 80 parts by weight as compared again to the total weight of the curable composition.

The hydrosilation and reactions described above may be carried out in a suitable solvent in order to facilitate the rate at which the reaction takes place. Generally, the amount of solvent used in the process of the invention is kept to the minimum that will adequately disperse the reactants. The amount of solvent required depends upon the viscosity of the starting materials and can be adjusted as dictated by the art. Preferable solvents for the hydrosilation reaction are non-polar solvents particularly those which are volatile. Use of a volatile solvent is preferred as the solvent may then be removed from the reaction products by stripping the reaction under vacuum. Most preferably xylene or toluene is used as solvent.

The temperature at which each step of the hydrosilation reactions is performed is generally that at which the reaction step is completed in a relatively short time interval, for example, under 2 hours per step. The precise temperature chosen will generally be between 25° C. and 150° C., and is most preferably between 50° C. and 125° C.

After the product of the invention is formed, any solvent and low molecular weight products of side reactions, commonly referred to as "light ends", are preferably removed from the composition by heating under a vacuum. Such a stripping step provides a much desired solventless product. A rotary evaporator, used as known in the art, is conveniently employed in this step of the process of the invention. "Thin film" or "wiped film" evaporators are also conveniently employed to efficiently remove light ends in commercial processing. The temperature of this so-called "stripping" step in the process of the invention is at between about 100° C. and about 250° C. Preferably this heating step is from between about 125° C. and about 225° C., and most preferably this step is performed at between about 150° C. and about 200° C. The pressure of the stripping step is generally below atmospheric, as such reduced pressure aids in the release of volatile molecules from the composition of the invention. Thus the lower the pressure that can be conveniently obtained, the better. Preferred in the stripping step in the process of the invention are pressures less than about 25 torr. Most preferred for this process step in the instant invention are pressures below about 10 torr.

The UV-curable epoxysilicone-polyether linear block copolymers of the present invention can be applied to cellulosic and other substrates including paper, metal, foil, polyethylene coated Kraft paper (PEK), supercalendered Kraft paper (SCK), polyethylene films, polypropylene films and polyester films. In general, coating can be applied to these substrates at the desired thickness as is known in the art. For example, compositions of the invention are readily applicable by doctor blade. For applications as a release coating, the compositions are applied at a thickness of between about 0.1 mil and 10 mils; it is also convenient to refer to such coatings in terms of "coat weights", typically about 1 g/m$^2$. Coatings can thereafter be cured either thermally or by exposure to radiation, as is known in the art.

Cure performance and adhesion of the epoxysilicone-polyether linear block copolymers described herein may also be enhanced by the addition of epoxy monomers to the compositions. For example, addition of up to 10 parts of an aliphatic epoxy monomer for every 10 parts epoxysilicone-polyether copolymer may result in compositions exhibiting superior UV cure and anchorage on porous cellulose paper as compared to similar compositions without these "reactive diluents".

The cure characteristics of the compositions of the instant invention are determined by qualitatively noting the presence and extent of smear and migration in a silicone-polyether copolymer coating after application to a substrate and irradiation. Irradiation is typically performed in a laboratory setting by exposing the coated substrate in an RPC UV Processor housing two Hanovia medium pressure mercury UV lamps, each generating 200 watts/in$^2$. Smear is detected in an incompletely cured coating when a finger firmly pressed across the silicone-polyether copolymer film applied to a substrate leaves an obvious permanent streak. Migration is detected by the Scotch ® cellophane tape test. The coating is considered well cured and migration-free if a piece of No. 610 Scotch ® tape will stick to itself after having been first firmly pressed into the silicone coating, then removed and doubled back on itself. If a silicone-polyether copolymer coating is shown to be migration-free by means of the Scotch ® tape test, it is considered to be a release coating because it adheres to the substrate with an adhesive force greater than that between the cured composition and the released aggressive Scotch ® tape. These qualitative tests are universally employed to ascertain the completeness of cure in silicone paper release coatings.

Due to the polyether blocks contained therein, the product of the present invention is much more miscible with polar molecules, particularly iodonium salt photoinitiators, than non-polyether-containing, epoxy-silicone polymers of comparable molecular weight. The product of the present invention, as exemplified below, is therefore much more faster curing despite the low concentration of epoxy function in the linear block copolymer than comparable epoxysilicones lacking the polyether block. In addition, the product of the invention also provides for coatings which are more flexible and elastic than those derived from UV cured, linear epoxy-silicones without polyether blocks of similar molecular weight.

A general drawback to currently available, UV-curable epoxysilicones is that these materials are relatively brittle due to high crosslink density and short polysiloxane chain lengths between epoxy crosslink sites. In many applications, it would desirable to have more flexible and elastic coatings that still retain all the useful properties and ease of manufacture afforded by traditional silicone resins. Therefore, the physical characteristics of the UV-cured polysiloxane-polyether block copolymers were also examined. As also exemplified below, the incorporation of a polyether block into the siloxane backbone greatly increases the flexibility and elastomeric properties of the polymer as compared to those of similar molecular weight silicone without the polyether block.

In many applications of silicone coatings, the material is applied in a very thin layer, for example, 0.5 mil or less. In such applications, most importantly with colorless coatings, it is extremely difficult to detect poor coating patterns. This problem is particularly troublesome when coating onto shiny, glossy film type liner, with conventional silicones that are immiscible with UV dye markers in the absence of a separate dispersing medium. Due to their increased miscibility with polar molecules, the epoxysilicone-polyether linear block copolymer of the present invention also provides for a silicone-based polymer that, when mixed with a UV-detectable dye marker, provides a coating material in which the coating process can be easily and accurately monitored. By "UV-detectable" it is meant that the presence of a dye marker is detectable when exposed to low wattage UV light (a so called "black light") but not when exposed to visible light.

Preferably, the dye marker of the present invention is UV-detectable, so that clear coatings can be produced and still monitored for coating accuracy. However, it should be understood that many polar dyes, regardless of color or lack thereof, which are unsatisfactorily miscible with non-polyether containing siloxanes, are suitable for use in the product and process of the present invention. In the preferred process and product of the present invention, the UV-detectable dye marker may be any suitable dye known, provided that the dye molecule itself is not so basic in nature or included in the product of the invention at such a concentration so as to substantially interfere with the cationic curing, and elastomeric properties of the epoxysilicone-polyether linear block copolymers of the instant invention. Particularly suitable UV-detectable dyes include 2,2'-(2,5-thiophenediyl)bis(5-tert-butylbenzoxazole), Uvitex OB ® (Ciba Geigy Corp., Hawthorne, N.Y.).

As indicated in the examples below, when the product of the invention incorporates a UV-detectable marker dye, the sufficiency of even very thin silicone coatings is easily monitored by use of a low intensity "black light". Application of the resin to a substrate can thus be either monitored visually, or through mechanical means which detect the absence of the appropriate UV light emanating from the applied resin. The incorporation of a dye marker in the product of the invention thus allows an economical yet highly efficient means for determining the adequacy of coating.

Experimental

Unless otherwise indicated, all resins and catalysts are available from General Electric Silicones, Waterford, N.Y. In the shorthand notation of polymer structure below, the following apply:

M represents $(CH_3)_3SiO_{0.5}$;

$M^\epsilon$ represents 
$$\begin{pmatrix} O \diagup \begin{matrix} CHCH_2CH_2 \\ | \\ CHCH_2CH(CH_2)_2 \end{matrix} \end{pmatrix} (CH_3)_2SiO_{0.5}$$

$M^H$ represents $(CH_3)_2(H)SiO_{0.5}$;

$M^{Vi}$ represents $(CH_2=CH)(CH_3)_2SiO_{0.5}$;

D represents $-(CH_3)_2SiO-$;

D' represents $-SiO(CH_3)_2CH_2CH_2-$ $D^\epsilon$ represents $-OSi(CH_3)\begin{pmatrix} CH_2CH_2CHCH_2CH \\ | \quad\quad\quad\quad\quad | \\ \quad\quad\quad\quad O \\ CH_2CH_2CH \diagup \end{pmatrix}$ $D^H$ represents $-(CH_3)(H)SiO-$; and, subscripts represent the number of such units.

EXAMPLE 1

Epoxysilicone-polyether linear block copolymer

Fifty three grams of an SiH-stopped linear polydimethylsiloxane, of approximate formula $M^HD_{34}M^H$, 750 ppm H, for a total of 0.04 moles reactive SiH, were weighed into a 500 cc flask with 2.74 grams TEGDAE (0.01 mole, corresponding to 0.02 mole allyl) plus 50 grams toluene. The mixture was thoroughly stirred, after which the baseline SiH content was determined by Fourier Transform Infrared Spectroscopy (FTIR) (The strong SiH absorbance at 2200 cm$^{-1}$ being monitored). A first hydrosilation reaction was then initiated by the addition of 0.02 grams of SPBD platinum hydrosilation catalyst as defined in U.S. Pat. No. 3,775,452, after which the total reaction mixture was brought to 75° C. The reaction was maintained at this temperature for 1 hour, after which the SiH content was again determined. At this point the peak height, corresponding to the amount of unreacted SiH, was 52% that of the starting peak height (theoretical value is 50% starting peak height). Three grams of 4-vinylcyclohexeneoxide (VCHO; 0.024 moles) were next added to the reaction mixture and the temperature maintained for an additional hour at 75° C. After the second hydrosilation reaction, no SiH was detected by FTIR. 0.005 grams of methyldicocoamine stabilizer was added to the reaction solution to prevent premature gelling, after which the solution was stripped of solvent and remaining VCHO by heating at 160° C. for one hour, in vacuo (less than 25 torr). The process resulted in 56 grams of a 116 cstk fluid product as measured on a Brookfield LVF #4 viscometer at 60 rpm, with a refractive index $n_D^{25}=1.4139$. Based upon the progressive loss of SiH during the reaction, the fluid has a average structure of ti $M^\epsilon D_{34}D'O[(CH_2)_2O]_4(CH_2)_2D'D_{34}M^\epsilon$ and possesses an Epoxy Equivalent Weight of 2911.

EXAMPLE 2

Non-ether containing comparative example

One hundred grams of an SiH-stopped polydimethylsiloxane of approximate formula $M^HD_{75}M^H$, 350 ppm reactive H or 0.035 moles total reactive H, were reacted with 6 grams VCHO (0.048 moles) for one hour at 70° C., in the presence of 0.02 grams platinum hydrosilation catalyst as defined in U.S. Pat. No. 3,775,452. After completion of the incubation, the reaction was stripped of solvent and excess VCHO as in Example 1. The resulting isolate was 103 grams of a 146 cstk viscosity fluid product, $n_D{}^{25}=1.4083$, with the approximate average formula $M^\epsilon D_{75}M^\epsilon$.

EXAMPLE 3

UV Cure Analysis of the products of Examples 1 and 2

100 parts of test silicone resin as produced in Examples 1 and 2, were individually blended with 2 parts of a 50% bis(dodecylphenyl)iodonium hexafluoroantimonate sensitized photocatalyst solution (described in U.S. patent application Ser. No. 07/710,266, filed Jun. 14, 1991. The resulting mixture was then manually coated as a 2 mil thick coating on polyethylene kraft substrate, or as thinner coatings (approximately 1.5 g/cm² ct.wt.) on supercalendered Kraft paper. Coated specimens were cured by exposure to UV light as previously described in U.S. Pat. No. 4,990,546, and the minimum UV light flux required for cure to smear- and migration-free surfaces determined with an International Light, Model 700A Research Photometer equipped with a Model A309 Lightbug accessory. The results of these tests for a series of epoxysilicone-polyether copolymers and epoxy-stopped linear silicone control polymers are given in Table 1.

TABLE 1

| EX-AMPLE | STRUCTURE | 2 MIL UV FLUX (mJ/cm²) | THIN FILM FLUX (mJ/cm²) |
|---|---|---|---|
| 1 | $M^\epsilon D_{36}D'O[(CH_2)_2O]_4D'D_{36}M^\epsilon$ | 27 | nt |
| 2 | $M^\epsilon D_{75}M^\epsilon$ | 250 | nt |
| 3 | $M^\epsilon D_{22}D'O[(CH_2)_2O]_4D'D_{22}M^\epsilon$ | 33 | 30 |
| 4 | $M^\epsilon D_{40}M^\epsilon$ | 50 | 80 |
| 5 | $M^\epsilon D_{34}D'O[(CH_2)_2O]_4D'D_{34}M^\epsilon$ | 42 | 86 |
| 6 | $M^\epsilon D_{40}D'O[(CH_2)_2O]_4D'D_{40}M^\epsilon$ | 42 | 86 |
| 7 | $M^\epsilon D_{11}D'O[(CH_2)_2O]_4D'D_{11}M^\epsilon$ | 63 | nt |
| 8 | $M^\epsilon D_{54}D'O[(CH_2)_2O]_9D'D_{54}M^\epsilon$ | 177 | nt | nt = not tested

Physical Characteristics of UV-Cured Films in Example 3.

Thick sheets of the blends given in Example 3 (approximately 6 mils) were manually cast and thereafter exposed to sufficiently high UV flux to thoroughly cure the films. Standard ASTM tensile bars were cut from the slabs, and peak tensile and elongation at break were measured on an Instron testing device. The results of these tests are tabulated in Table 2.

TABLE 2

| EX-AMPLE | STRUCTURE | % ELONGATION | TENSILE (PSI) |
|---|---|---|---|
| 1 | $MD^\epsilon{}_3D_{20}M$ | nd | nd |
| 2 | $M^\epsilon D_{22}D'O[(CH_2)_2O]_4D'D_{22}M^\epsilon$ | 3–4 | 16–18 |
| 3 | $M^\epsilon D_{40}M^\epsilon$ | 1–4 | 14–19 |
| 4 | $M^\epsilon D_{34}D'O[(CH_2)_2O]_4D'D_{34}M^\epsilon$ | 23–31 | 27–36 |
| 5 | $M^\epsilon D_{36}D'O[(CH_2)_2O]_4D'D_{36}M^\epsilon$ | 33–40 | 27–36 |
| 6 | $M^\epsilon D_{75}M^\epsilon$ | 16–22 | 30–36 |
| 7 | $M^\epsilon D_{40}D'O[(CH_2)_2O]_4D'D_{40}M^\epsilon$ | 57–67 | 38–58 |
| 8 | $M^\epsilon D_{54}D'O[(CH_2)_2O]_9D'D_{54}M^\epsilon$ | 60–80 | 21–32 | nd = too brittle to measure

EXAMPLE 9

Pre-crosslinked epoxysilicone-polyether linear block copolymer containing a UV-detectable dye marker.

Fifty grams of SPBD silicone resin grade 88405, approximate structure $MD_{15}D^H{}_4M$, corresponding to 0.19% H, and 20 grams of SPBD silicone grade 88934, a 900 cstk vinyl-stopped dimethylsilicone fluid, approximate structure $M^{Vi}D_{150}M^{Vi}$, and 10 grams of an allyl-stopped polyether of approximate structure $CH_2\!=\!CHCH_2O(CH_2CH_2O)_{11}CH_2CH\!=\!CH_2$, were dispersed in 100 grams toluene, thoroughly mixed, and a reference FTIR of the solution obtained. 0.07 grams of a solution of $RhCl_3[[(CH_3)(CH_2)_3]_2S]_3$ in ethanol, 1.36% rhodium by weight, were then added and the reaction mix brought to 110° C. and held at this temperature for about 1.5 hours. Infrared analysis showed that 65% of the starting SiH remained unreacted at this point. 0.008 grams $CH_3(C_{18}H_{37})2N$ stabilizer were then added along with 7.5 grams VCHO. The reaction was held at 110° C. for an additional 2 hours, at which point the batch was determined to be free of unreacted SiH. Sufficient Uvitex OB fluorescent dye was introduced into the reaction mixture as a 2% solution in methylene chloride, to furnish 100 ppm dye, by weight, in the final product after stripping off the solvent and various siloxane "light ends" (low boiling point side reaction products) in vacuo. Eighty grams of product was obtained as a 36,000 cps viscosity fluid, having a refractive index $n_D{}^{25}=1.4191$. The dye marker proved to be soluble in the product at the 100 ppm concentration.

EXAMPLE 10

An epoxy-stopped polydimethylsilicone/polyether block copolymer was prepared as in Example 5, with the exception that 10 grams of vinyl-stopped silicone fluid (grade 88934) and 10 grams of the same diallyl-polyether cited in Example 5 were used as the "pre-crosslinkers" reacting with the grade 88405 SiH fluid prior to the addition of VCHO. The product yield was 66 grams of a 3844 cstk fluid, with a refractive index of $n_D{}^{25}=1.4212$. As with the product in Example 5, Uvitex OB fluorescent dye, at 100 ppm, was completely miscible with this product.

EXAMPLE 11

An epoxy-stopped polydimethylsilicone-polyether block copolymer was prepared as in Example 5, with the exception that 5 grams of 88934 vinyl-stopped silicone fluid and 10 grams of diallylpolyether was used as the "pre-crosslinkers" reacting with the 88405 SiH silicone fluid prior to the addition of VCHO. The product yield was 66 grams of a 1982 cstk viscosity fluid, with a refractive index $n_D{}^{25}=1.4214$. Uvitex OB[R] fluorescent dye, at a concentration of 100 ppm, by weight, was also completely miscible with this product.

EXAMPLE 12

UV Cure of the Products of Examples 5, 6 and 7

The UV cure characteristics of the products obtained in Examples 5, 6 and 7 was assessed by blending 100 parts of the respective polymers with 2 parts of the sensitized iodonium photocatalyst solution used in the previous UV cure Example described, followed by manually applying a 0.5 mil coating of these compositions to polyethylene-coated Kraft paper. The minimum UV flux needed to render the coating smear- and migration-free was then determined. The product of Example 6, without the dye marker present, required a UV flux of about 35 mJ/cm² for cure, whereas with the dye marker at 100 ppm, this material required about 80 mJ/cm² UV flux. Coatings with the dye marker proved to be easily detectable under a low power "black light" source. It should be noted that, although the dye marker present at 100 ppm does slow the UV cure response by competing with iodonium photocatalysts for available deep UV radiation, acceptably prompt UV cure is still obtained.

EXAMPLE 13

95 grams of SiH-containing polymer 88405 (described above) were dispersed in a 500 cc flask with 100 grams toluene plus 10 grams of a diallylated polyethyleneoxide, approximate structure $CH_2=CHCH_2O(CH_2CH_2O)_{10}CH_2CH=CH_2$, and 0.04 grams of the sensitized iodonium photocatalyst solution described in Example 3. The polar polyether was not completely miscible in this reaction mixture, even at 100° C. Nonetheless, the agitating catalyzed blend was brought to 100° C. for 2 hours, then cooled, at which time it was observed that discrete undispersed polyether was no longer visible in the reaction medium, a strong indication that the polyether had reacted with a portion of SiH present on the 88405 fluid. Ten grams of vinyl-stopped silicone fluid (GES 88568 grade), approximate formula $M^{Vi}D_{100}M^{Vi}$, were then added to the reaction mixture, and the batch returned to 100° C. for 2 hours to effect the reaction of the vinyl-stopped silicone with some of the SiH as yet unreacted. Finally, 18 grams of VCHO was slowly added by dropping it into the reaction mixture at 80° C. Examination of this reaction mixture subsequent to VCHO addition and 2 hour hold revealed that no unreacted SiH was detectable. Removal of solvent and other low boilers in vacuo afforded 126 gram yield of a 739 cstk viscosity, clear fluid product.

COMPARATIVE EXAMPLE 13A 95 grams of the SiH-containing polymer 88405 (described above) plus 20 grams of the vinyl-stopped polymer 88568 were dispersed in 100 grams toluene with 0.04 grams of the catalyst solution described in Example 3. This blend was maintained at 80° C. to react the vinyl-stopped silicone with a portion of the SiH present in the reaction mixture. After two hours, 23 grams of VCHO were reacted with the remainder of SiH as in Example 13. Removal of the solvent and low boilers yielded 130 grams of a 212 cstk viscosity, clear fluid product.

100 parts of the product of Example 13 proved miscible with 1 part of (4-octyloxyphenyl)(phenyl)iodonium hexafluoroantimonate (described in U.S. Pat. No. 4,882,201). 0.5 mil coatings of this photo-curable mixture were applied to PEK substrate, and found to crosslink to tack-free, migration-free adhesive coatings when exposed to 25 mJ/cm² focused ultraviolet light. The product of Example 13 was similarly miscible with the bis(dodecylphenyl)iodonium hexafluoroantimonate catalyst used in the previous Examples; catalyzed mixtures of 1 part of the latter catalyst plus 100 parts of the product of Example 13 cured to similar 0.5 mil abhesive coatings on PEK on exposure to 85 mJ/cm² ultraviolet light. By contrast the polymer product of Comparative Example 13A was immiscible with the (4-octyloxyphenyl)(phenyl)iodonium hexafluoroantimonate catalyst, and could only be cured in the presence of the bis(dodecylphenyl)iodonium hexafluoroantimonate catalyst.

In addition to the above, the polymer product of Example 13 was quite miscible with 100 ppm of the Uvitex OB ® fluorescent dye marker, whereas the product of Comparative Example 13A would not accommodate this additive in any useful concentration.

Accordingly, 20% solutions of photo-catalyzed polymers from Example 13 and Comparative Example 13A were prepared in hexane/acetone. Each solution included 1 part bis(dodecylphenyl)iodonium hexafluoroantimonate catalyst per 100 parts polymer. The solution containing polymer from Example 13 also included 100 ppm Uvitex OB ® dye marker (per part of polymer). These solutions were coated onto glossy white polyethylene coated Kraft stock using a #2 wire-rounded rod mounted in a mechanical lab coater. Solvent was flashed off during brief exposure to two 300 watt ultraviolet lamps in the above-described RPC Lab Processor, which cured each coating to smear- and migration-free adhesive surfaces. The coat weight in each case was determined to be 1.1 g/m², typical of silicone release coatings. 3 mil (dry) of solvent-borne aggressive acrylic PSA, Ashland 1085, were applied atop the cured silicone, then cured thermally before a face sheet of supercalendered Kraft (SCK) was firmly affixed to the adhesive layer. The resulting construction was cut into 2 inch wide tapes, and the force required to remove the silicone/PEK lamina from the adhesive/SCK lamina measured at 400 in/min pull speed, 180° pull angle. The non-polyether containing coating derived from Comparative Example 13A epoxysilicone released the PSA when 42 g/2 inch force was exerted; the polyether block copolymer-containing epoxysilicone from Example 13 released the same PSA lamina with 90 g/2 inch force. While the presence of about 8% by weight polyether appeared to double the release compared to the non-polyether silicone, 90 g/2 inch release versus the aggressive Ashland 1085 acrylic PSA is acceptable for most release liner applications. Also, the cured film of Example 13 on the glossy PEK sheet was clearly outlined under "black light" due to the 100 ppm fluorescent dye marker, while the extent and quality of the coating from Comparative Example 13A was impossible to ascertain visually. It must be pointed out that this coating experiment was conducted using a solvent vehicle solely because there was no other means readily available for obtaining an even 1 g/m² silicone deposition without solvent-assisted coating.

It is understood that various other modifications will be apparent to and can be readily made by those skilled in the art without departing from the scope and spirit of this invention. Accordingly, it is not intended that the scope of the claims appended hereto be limited to the description set forth above but rather that the claims be construed as encompassing all of the features of patentable novelty which reside in the present invention, including all features which would be treated as equivalents thereof by those skilled in the art to which the invention pertains.

What is claimed is:

1. A process for producing a curable block copolymer epoxysilicone-polyether resin comprising the steps of:
   (a) reacting mixture comprising a molar excess of an organohydrogensiloxane and diallyl polyether to obtain a product wherein upon completion of the reaction there still exists unreacted SiH groups in the product; and,
   (b) reacting the product obtained in step (a) with an epoxy-functional olefin with the unsaturation terminally located on the alkyl chain to obtain a curable block copolymer epoxysilicone-polyether.

2. The process of claim 1 wherein the product of step (a) contains unreacted SiH groups in an amount of at least 20% of the SiH initially present.

3. The process as set forth in claim 1, wherein in step (a) said organohydrogensiloxane is an SiH-stopped organosiloxane.

4. The process of claim 3 wherein the product of step (a) contains unreacted SiH initially present in an amount of at least 70% of the SiH initially present.

5. The process as set forth in claim 1, wherein the mixture in step (a) additionally comprises a platinum or rhodium metal complex hydrosilation catalyst.

6. The process as set forth in claim 5, wherein in step (a) said hydrosilation catalyst is tris(triphenylphosphine) rhodium trichloride or tris(di-n-butylsulfide) rhodium trichloride.

7. The process as set forth in claim 1, wherein in step (a) said diallyl polyether is a diallylated derivative of a glycol.

8. The process as set forth in claim 1, wherein in step (a) said diallyl polyether is of the formula $$CH_2=CHCH_2O(R^3O)_mCH_2CH=CH_2$$

where $R^3$ and m are defined as in claim 1.

9. The process as set forth in claim 1, wherein in step (a) said mixture additionally comprises a tertiary amine.

10. The process as set forth in claim 1, step (b) comprising reacting the product obtained step (a) with an epoxy-functional olefin in the presence of a hydrosilation catalyst.

11. The process as set forth in claim 1, wherein in step (b) said epoxy-functional olefin is selected from the group consisting of limoneneoxide, 4-vinylcyclohexeneoxide, allylglycidylether, glycidylacrylate, 7-epoxy-1-octene, vinylnorbornene monoxide and dicyclopentadiene monoxide.

12. The process of claim 11 wherein the epoxy-functional olefin is 4-vinylcyclohexeneoxide.

13. The process as set forth in claim 1, wherein in step (a) said mixture additionally comprises a dye marker.

14. The process as set forth in claim 1, additionally comprising the step:
(c) curing the epoxysilicone-polyether obtained in step (b).

* * * * *